United States Patent [19]

Crowdis

[11] Patent Number: 4,903,990
[45] Date of Patent: Feb. 27, 1990

[54] PROBLEM SHEET FOR SELF-EVALUATED MATHEMATICS EXAMINATION

[76] Inventor: John A. Crowdis, 202 N. Baptist Dr., Blakely, Ga. 31723

[21] Appl. No.: 343,437

[22] Filed: Apr. 26, 1989

[51] Int. Cl.⁴ .............................................. G09B 19/02
[52] U.S. Cl. ...................................... 283/44; 434/191; 434/327; 434/353; 434/363
[58] Field of Search ................... 283/44, 117; 434/191, 434/322, 327, 363, 353

[56] References Cited

U.S. PATENT DOCUMENTS

| | | | |
|---|---|---|---|
| 1,354,707 | 10/1920 | Waterhouse | 283/44 |
| 1,509,889 | 9/1924 | Wheaton | 283/44 |
| 1,750,977 | 3/1930 | Thompson | 283/44 |
| 1,884,676 | 10/1932 | Hendrie | 283/44 |
| 2,789,370 | 4/1957 | Studebaker et al. | 434/191 |
| 3,212,201 | 10/1965 | Jensen | 434/191 |
| 3,318,022 | 5/1967 | Dorn | 434/191 |
| 3,975,021 | 8/1976 | Brown | 434/191 |

Primary Examiner—Frank T. Yost
Assistant Examiner—Eugenia A. Jones
Attorney, Agent, or Firm—Sutherland, Asbill & Brennan

[57] ABSTRACT

A printed sheet of paper that is useful as a self-evaluated mathematics test is disclosed. The sheet has inscribed thereon an arrangement of the numerals that represent first and second cardinal numbers. The numerals are so positioned as to indicate a mathematics problem calling for the first and second numbers to be either added together, subtracted one from the other, multiplied one by the other, or divided one by the other. The correct answer to the problem is a third number having at least two digits, but that number does not appear in the arrangement. Instead, there is the inscription of a fourth number (a "check answer"), which reprsents the sum of all of the digits of the correct answer. The student can check the correctness of his or her answer before handing in the completed test, by adding together the digits in his or her answer and seeing if the sum matches the check answer. If the two do not match, the student knows to rework the problem, but still does not know what the correct answer is.

8 Claims, No Drawings

PROBLEM SHEET FOR SELF-EVALUATED MATHEMATICS EXAMINATION

This invention relates to a printed sheet of paper that is useful as a self-evaluated mathematics test. In particular, it relates to such a sheet of paper on which arithmetic problems appear, together with unique numerical indicators that allow the student to determine with reasonable certainty whether his or her answer is correct, without actually revealing what the correct answer is.

Since 1983 I have been teaching math to Chapter I students. Consequently, I have had to face the ageless problems all educators of poorly motivated underachievers must face. It began when I walked into a classroom of sixth grade students who were performing from one to three grade levels below expectation.

Determined not to fall into the lethargic pattern of acceptance that entraps many Chapter I teachers (i.e., teachers of socially and economically disadvantaged students in elementary and secondary schools, as addressed in Chapter 1, Title 1, of the Elementary and Secondary Education Act of 1965, as amended Apr. 28, 1988), I refused to allow my classroom to become a dumping ground or graveyard in which students removed from the mainstream would stagnate. I realized that if my expectations were low, the result could only become a sterile learning environment.

My students' problems were glaringly evident. Lack of motivation, doubtlessly the result of low self-image, stood out immediately. The failure syndrome had been effective as usual, and the self-fulfilling prophecy had compounded that effect to produce children who saw themselves as hopeless and had consequently built shells of indifference around themselves. Alongside this situation, the almost total lack of knowledge in computation skills presented me with a wall of blank, bored faces, and I resolved to break through that barrier and wage my war on ignorance.

Not being one to back off from challenge, I went to work immediately, gearing my spare time and strategic experience toward the development of a motivational method which I hoped would:

(1) reverse the failure rate to one of success,
(2) challenge a negative attitude to become a positive one,
(3) counteract a negative self-image,
(4) review computation facts inconspicuously and reroute learning through self-motivated activities, and
(5) restructure stereotypical student-teacher relationships toward a partnership where success is productive and self-rewarding.

My method underwent several years of modification through trial and error, but its eventual results were so overwhelmingly positive that I am sometimes awed myself by the change in my students. What I have witnessed is a transformation within a few short months from bored, blase students who dully accepted their inferiority, into active, productive ones, filled with self-importance and the beginning of an intrinsic drive.

It was at this crossroads that I decided to label and share my method, which I call simply "The Check Answer Method", with fellow educators. It is a procedure inconspicuous in its simplicity, but its positive effect on students cannot be denied.

The "Check Answer Method" is a technique for teaching mathematical computations to low achievers by combining a system of self-evaluation (called the check answer) with animated teaching and a unique schedule of tangible reinforcement. The "Check Answer Method" requires the use of a novel sheet of paper. The paper has inscribed thereon an arrangement of numerals that represent first and second cardinal numbers. The numerals are so positioned in the arrangement as to indicate a mathematics problem (or mathematical set) calling for the first and second numbers to be either added together, subtracted one from the other, multiplied one by the other, or divided one by the other.[1] The correct answer to the problem is a third number having at least two digits. The arrangement, however, is devoid of any numerals that actually represent the third number. Instead, the arrangement includes one or more numerals that represent as a fourth number (preferably off to the side) the sum of all of the digits of the missing answer (the "third number").

[1] By "numerals" is here meant a symbol that represents a single-digit number. Thus, the cardinal number "one hundred seven" may be represented by use of the three numerals "1", "0", and "7" like so: 107.

Upon working the problem inscribed on the sheet of paper, the student, with the aid of the check answer already provided in the margin, can determine by himself if his work is correct, without actually being given the answer. He does this by totalling the digits in his answer and comparing that total with the check answer inscribed beside the problem. If he arrives at the same number as the check answer, he may assume, with a reasonable degree of certainty, that his work is correct. If he gets a different total, he knows his answer is wrong. When he finds that an answer is wrong, the student can immediately recheck his computation to try to locate his error (unconsciously reviewing his math facts in the process). He still has to work the problem out for himself, however, since the correct answer is not inscribed on the sheet.

Preferably, the check answer will be enclosed in brackets or parentheses. The invention is most useful in situations in which at least one of the first and second cardinal numbers represented in the arrangement has two or more digits. Normally, the sheet of paper (which can be a stand-alone quiz sheet or a page in a mathematics text), will contain a plurality of such arrangements, i.e., a number of such problems with their "check answer" sums inscribed beside them.

The represented numbers in the arrangement of numerals are positioned in the conventional way to indicate a mathematics problem, and preferably the arrangement will include a printed sign denoting either addition, subtraction, multiplication, or division. Thus, for example, in the case of a multiplication problem the numerals representing the first and second cardinal numbers are positioned in two horizontal rows, one above the other, the multiplicand above and the multiplier below, and, preferably, a multiplication sign is located to the left of the multiplier. A horizontal line is printed underneath the multiplier and the numeral(s) that represent(s) the check answer is (are) located below that line, preferably off to one side. For a multiplication problem in which the multiplier has two or more digits, the arrangement may also include below the line one empty horizontal row for each numeral appearing in the multiplier. Beneath this series of empty rows will be a second horizontal line. To one side of each empty row may be one or more numerals representing the sum of the digits of whatever number is the correct multiplication product for that particular row.

Thus, when the numerals are arranged so as to indicate a mathematical problem calling for the multiplication of, say, two three-digit numbers, there may be three empty rows between the two horizontal lines, and to the side of each of those empty rows (preferably the right side) the check answer for that particular row may appear. Also, there will be the final check answer below the bottom line, and preferably it will be vertically aligned with the three check answers above it.

The "Check Answer Method" can be used in the computations of addition, subtraction, multiplication, and division. Addition, subtraction, and one-digit multiplication have only one check answer. Multiplication with a two-digit multiplier can involve three check answers. Multiplication using a three-digit multiplier involves four check answers, etc. A mathematical set for a long division problem can be accompanied by a check answer for each product and remainder the student has to calculate in order to work the problem, as well as a check answer representing the sum of all of the digits in the quotient. If desired, however, the set for each multiplication and long division problem can be accompanied by only a single check answer—that being for the ultimate product or quotient.

Where the arrangement indicates an addition problem, more than two cardinal numbers can of course be represented—i.e., the problem can call for the addition of several numbers.

The check answer may be used in association with any mathematical function which uses one or more of the computations (addition, subtraction, multiplication, and division). Therefore, it may be applied to word problems, as well as to calculations of perimeter, area, volume, diameter, circumference, mean range, median, square root, etc.

The invention will be illustrated in the following examples.

EXAMPLE 1

Addition:

(1) 39,879　(2) 39,879　　　　(3) 39,879
　　+ 7,697　　　+ 7,697　　　　　+ 7,697
　　　　　　　　　　　　(*29)　　47,576　(*29)

Student arrives at answer and checks it by totalling all of the digits in his sum:

$4 + 7 + 5 + 7 + 6 = 29$

He then compares the sum of the digits in his answer with the check answer (*29). Finding agreement between the two numbers, he assumes his answer is correct and he goes on to the next problem.

Inscription 1, above, represents the prior art version. The inscription of the present invention (2) is the same as Inscription 1, except the check answer has been provided to the right of the problem. After the student completes his computation (Inscription 3), he adds together the digits of his answer and compares that sum with the check answer number. If the numbers match, the student can assume that his computation is probably correct. If the numbers do not match, he knows his computation is incorrect and needs to be redone.

EXAMPLE 2

Subtraction:

(1)　6,076　(2)　6,076　　　　(3)　6,076
　　−3,998　　　−3,998　　　　　−3,998
　　　　　　　　　　　　(*17)　　2,078　(*17)

Student arrives at answer and checks it by totalling digits in his remainder:

$2 + 0 + 7 + 8 = 17$

Inscription No. 1 is the prior art version. The inscription of the present invention (No. 2) is the same as No. 1, except the check answer (*17) has been placed to the right of the problem. After the student completes the computation (see No. 3), the digits of his answer are added together and the total is compared with that of the check answer. If the total matches that of the check answer, the student can assume his computation probably is correct. If they do not match, he reviews his work to correct mistakes.

EXAMPLE 3

Multiplication:

Multiplication is the computation that is most aided by use of the check answer. Because of the many steps involved in multi-digit multiplication, students have more chances to make mistakes. Consequently, many teachers of low achievers opt to skip altogether the objective of mastering multiplication using three-digit multipliers, and instead stop at two. They feel that their student success rate in correctly working all the steps of a problem having a three-digit multiplier will be too low to warrant the time and effort.

To enhance student success rate and build confidence with this type of computation, it is recommended that the student be given a check answer for each row of multiplication. The ones, tens, and hundreds rows will have their own check answers, as will the final product row. Having check answers for each row and product enables the student who fails to make the computation correctly to pinpoint his problem area and monitor his own progress. This method allows the student to develop confidence and proficiency in working with a problem that, on the average, requires 27 computations (where a three-digit multiplier is involved).

(A) Multiplication by one digit has one check answer:

The check answer for this problem is found by totaling the digits in the product.

6,522
　× 　　9
　58,698　(*36) 5 + 8 + 6 + 9 + 8 = 36

(B) Multiplication by two digits has three check answers:

```
   2,856        2,856          2,856           2,856
  × → 48        ×   8          ×  40           ×  48
              22,848  (*24)    xx,xxx          22,848
                              114,240  (*12)  114,240
                                              137,088  (*27)
```

(C) Multiplication by three digits can have four check answers:

```
    624           624            624             624              624
   × 176         ×   6          ×  70           × 100            × 176
                3,744  (*18)    x,xxx           x,xxx            3,744
                               43,680  (*21)   xx,xxx           43,680
                                               62,400  (*12)    62,400
                                                               109,842  (*24)
```

A sheet of paper presenting the above three multiplication problems in the manner of the present invention might look as follows:

```
(A)  6,522     (B)  2,856      (C)    624
     ×  9          ×  48            × 176
          (*36)          (*24)           (*18)
                         (*12)           (*21)
                         (*27)           (*12)
                                         (*24)
```

EXAMPLE 4

Long Division:

The check answer is found by adding together the digits in the quotient, or quotient plus remainder when a remainder is required.

```
Illustration A        Illustration B
                      with remainder included
                      in check answer
        42  (*6)           113R1 1  (*7)r
    7) 294             27) 3062
      −28                  −27
       14                   36
      −14                  −27
        0                   92
                           −81
                            11
```

The above division problems would appear as below in the text:

```
Illustration A     Illustration B
         (*6)             (*7)r
    7) 294           27) 3062
```

Besides providing review of math computation facts, the major advantage in using the novel problem sheet of the present invention is that it gives the student immediate feedback on each problem as it is worked, and therefore lessens the chances of the student's becoming overwhelmed by a page full of errors. It is important that the student be able to immediately and privately locate his mistakes and correct them for several reasons:

(1) Further ingraining of misapplied math facts will be prevented. The student, for instance, may consistently be using the wrong product for two particular factors when multiplied together (e.g., as in $7 \times 7 = 41$), and repetition of the error may ingrain it further, so that it will become more problem at its onset and correct it then, the true math fact (i.e., $7 \times 7 = 49$) is the one that will be reinforced and ingrained.

(2) The student has been given an instrument of self measurement that is simple enough to use and which gives immediate one-on-one feedback. With this instrument he can experience a newfound feeling of achievement, which in turn elevates his self-concept—a factor so vital to the success of the low achiever. The student suddenly understands that his success is under his control and is not the sole responsibility of his instructor.

(3) The "Check Answer Method" does not discriminate against personality types. It is equally effective with both introverted and extroverted behaviors. In fact, the method is particularly sensitive to that type of student who haunts the corners of the classroom, wanting neither to be seen nor heard, for fear of peer ridicule if he overtly seeks help or admits his weaknesses. I have seen students who previously wanted nothing more than total anonymity, suddenly step forward to answer questions with as much confidence as any of their peers. Using check answers, these "lost causes" can become motivated, active classroom participants with a self-induced rate of success. I know of no other means of drawing this type of child out in mathematics class and giving him a feeling of success.

In using the "Check Answer Method" I find that it is important to partner the check answer with a system of both verbal and tangible immediate reinforcement. A candy reward works well. The aim of the instructor is to work toward an eventual goal of intrinsic motivation; however, the low achiever must at first be supplied with extrinsic reinforcement. Then, gradually, through repeated success and pride in his accomplishments, he will become more responsive to these inner rewards and they will outweigh the external and physical ones.

I began with an immediate self-retrievable candy reward for a specified amount of correct work. This worked beautifully. Students began to compete against each other in an attempt to earn the most candy. I believe the candy in itself became a status symbol for them, and what resulted was that students who had previously grumbled over a page of homework, now began completing classwork sheets (all correct) and, without prompting, picked up extra work sheets for classwork and homework, many completing as many as 12 extra work sheets of the present invention per night.

The classroom atmosphere evolved from being teacher-centered into a cooperative enterprise, with students developing productive work habits and a feeling of having made a substantial contribution to the class's achievements. The relationship between my students and myself moved toward a partnership in which my major role was that of an advisor. Success and self-worth were judged by output quality and quantity, and all of the students were capable of meeting the quota, since it was set by themselves. In fact, students pushed themselves harder than I would have pushed them, realizing goals that were always impressive, and at times astounding. At one point self-motivation was so high that one of my students completed 26 pages of mathematical computations over Christmas holidays?

It was at this point that I realized that candy or tangible reinforcement had become secondary. It had been unobtrusively replaced with the feelings of pride and cooperation instilled by a self-productive partnership environment. The time had come to gradually phase out the candy reward, but verbal reinforcement was more crucial than ever.

It should be emphasized that the "Check Answer Method" promotes and builds upon an intrinsic need in all students to find and correct their mistakes. The underachiever who has no concrete guideline becomes lost, however, and gives up after having this drive squelched by repeated failures. All children start out wanting to learn. It is failure to grasp abstractions easily that turns the slower learner into a potential "lost cause". He loses his self-confidence, is weak in his acquisition of facts, and needs concrete reinforcement.

A parallel can be drawn between the use of the check answer to strengthen and build upon the slow learner's weak understanding of math concepts, and the reliance of an accident victim upon a crutch when his leg has been injured. In fact, the educator's role in the classroom is easily equated to that of the physical therapist who sensibly prescribes a physical support, a crutch, to prevent further damage to the limb, which might occur should the patient attempt to walk unaided too soon.

In the beginning the patient moves slowly and carefully, relying heavily upon the crutch; but as his muscles are exercised and regain their full potential, he relies less and less upon the crutch. At the point where the support becomes a hindrance, it is set aside, never to be used again, and the goal of independence is achieved.

The check answer works in an analogous manner. Low achievers are very much handicapped, both educationally and psychologically. Their weaknesses are so paramount that they cannot be overcome without help. The check answer serves as a temporary crutch that is simple to use, reliable, and effective. Through initial dependence upon it, the underachiever exercises and strengthens his grasp of math facts through review and immediate feedback, assuring the eventual arrival of the day when he, too, can eliminate his educational crutch and work independently.

The "Check Answer Method" provides underachievers with the opportunity to learn and feel good about themselves. It gives them the impetus needed to achieve success in its most immediate form, and it builds on that base of success by adding extrinsic reward. Students move through stages of successful behavior followed by reward, but underlying it all is the real reason for the effectiveness of the method: children want to overcome their deficiencies. They want to become an active part of the educational mainstream. They seek achievement and peer acceptance, and the "Check Answer Method" guides them toward those goals by furnishing immediate feedback as they work out mathematical problems, helping them find and correct errors as they occur, and thus firmly learning math facts previously considered elusive.

With enough reinforcement and review of facts, and with a stronger feeling of self-worth, the student will naturally begin to work independently of the check answer as his self-confidence grows.

I claim:

1. A sheet of paper having inscribed thereon an arrangement of numerals that represent first and second cardinal numbers, said numerals being so positioned in the arrangement as to indicate a mathematics problem selected from the group consisting of a problem calling for the first and second numbers to be added together, a problem calling for the second number to be subtracted from the first number, a problem calling for the first number to be multiplied by the second number, and a problem calling for the second number to be divided by the first number, in each instance the correct answer to the problem being a third number having at least two digits, said arrangement being devoid, however, of any numerals representing said third number, but said arrangement including one or more additional numerals representing as a fourth number the sum of all of the digits of said third number.

2. The sheet of paper of claim 1 wherein all of the numerals in the arrangement are Arabic numerals.

3. The sheet of paper of claim 2 wherein at least one of the first and second cardinal numbers represented in the arrangement has at least two digits.

4. The sheet of paper of claim 3 wherein a plurality of such arrangements are inscribed on the sheet of paper.

5. The sheet of paper of claim 4 in which at least one of the arrangements of numerals inscribed thereon includes an inscribed sign denoting a mathematical calculation selected from the group consisting of addition, subtraction, multiplication, and division.

6. The sheet of paper of claim 3 wherein the numerals representing the first and second numbers are positioned in two horizontal rows, one row above the other, a multiplication sign is located to the left of the lower row of numerals, and the numerals that represent the fourth number are located below said line.

7. The sheet of paper of claim 6 wherein there are a plurality of numerals in each of the two rows above the horizontal line;

there are a plurality of empty horizontal rows below the line, the number of said empty rows being equal to the number of numerals in the row of numerals immediately above said horizontal line;

there is a second horizontal line below the empty rows;

and to the side of each empty row are one or more numerals representing the sum of the digits of whatever number is the correct multiplication product for that row.

8. The sheet of paper of claim 7 wherein the numerals beside each empty row are located on the right side of the empty row and are enclosed by marks selected from the group consisting of brackets and parentheses, and wherein the numerals representing said fourth number are located below the second horizontal line, in vertical aligned with said numerals located beside the empty rows, and are also enclosed by marks selected from the group consisting of brackets and parentheses.

* * * * *